(12) United States Patent
Orlando et al.

(10) Patent No.: US 7,353,647 B2
(45) Date of Patent: Apr. 8, 2008

(54) METHODS AND APPARATUS FOR ASSEMBLING GAS TURBINE ENGINES

(75) Inventors: Robert Joseph Orlando, West Chester, OH (US); Thomas Ory Moniz, Loveland, OH (US); John C. Brauer, Lawrenceburg, IN (US); John Leslie Henry, West Chester, OH (US); Raymond Felix Patt, Cincinnati, OH (US); Randy Marinus Vondrell, Sharonville, OH (US); James Patrick Dolan, Cincinnati, OH (US); Erich Alois Krammer, West Chester, OH (US); David Cory Kirk, Mason, OH (US)

(73) Assignee: General Electric Company, Schenectady, NY (US)

( * ) Notice: Subject to any disclaimer, the term of this patent is extended or adjusted under 35 U.S.C. 154(b) by 174 days.

(21) Appl. No.: 10/845,032

(22) Filed: May 13, 2004

(65) Prior Publication Data

US 2005/0252194 A1    Nov. 17, 2005

(51) Int. Cl.
*F02C 3/04* (2006.01)
*F02K 3/04* (2006.01)

(52) U.S. Cl. .................. 60/204; 60/226.1; 60/226.3; 60/791

(58) Field of Classification Search ............... 60/39.5, 60/806, 226.3, 262, 264, 231, 791, 39.17, 60/226.1; 239/265.17; 415/143, 144
See application file for complete search history.

(56) References Cited

U.S. PATENT DOCUMENTS 2,529,973 A * 11/1950 Sedille et al. ............ 60/262
2,654,216 A * 10/1953 Traupel ..................... 60/773
2,703,477 A *  3/1955 Anxionnaz ................ 60/262
2,858,671 A * 11/1958 Fox ......................... 60/39.25
3,070,131 A * 12/1962 Wheatley ................. 60/39.23
3,255,586 A *  6/1966 Hennig et al. ............. 60/773
3,472,487 A * 10/1969 Moellmann ............... 60/791
3,508,403 A *  4/1970 Neitzel ..................... 60/262
3,641,766 A *  2/1972 Uehling .................... 60/262
3,688,504 A    9/1972 Hutchinson et al.
3,867,813 A *  2/1975 Leibach .................. 60/39.17

(Continued)

FOREIGN PATENT DOCUMENTS

EP       0564135      10/1993

(Continued)

OTHER PUBLICATIONS

France Search Report, Application No. 0504215 (Sep. 10, 2007).

*Primary Examiner*—Ted Kim
(74) *Attorney, Agent, or Firm*—William Scott Andes; Armstrong Teasdale LLP

(57) ABSTRACT

A method facilitates assembling a gas turbine engine including a compressor and a rotor assembly coupled in axial flow communication downstream from the compressor. The method comprises coupling a bypass system in flow communication with the compressor to channel a portion of flow discharged from the compressor towards the rotor assembly is channeled through the bypass system, and coupling a downstream end of the bypass system within the gas turbine engine such that the flow entering the bypass system flows past the rotor assembly and is discharged downstream from the rotor assembly.

14 Claims, 3 Drawing Sheets

U.S. PATENT DOCUMENTS

| | | | | |
|---|---|---|---|---|
| 4,005,575 | A * | 2/1977 | Scott et al. | 60/226.1 |
| 4,631,914 | A * | 12/1986 | Hines | 60/775 |
| 4,815,282 | A * | 3/1989 | Wilkinson et al. | 60/247 |
| 5,136,837 | A | 8/1992 | Davison | |
| 5,137,230 | A | 8/1992 | Coffinberry | |
| 5,163,286 | A * | 11/1992 | Jaw | 60/39.17 |
| 5,311,735 | A | 5/1994 | Orlando | |
| 5,485,717 | A * | 1/1996 | Williams | 60/226.1 |
| 6,205,771 | B1 * | 3/2001 | Rowe | 60/226.1 |
| 6,324,848 | B1 | 12/2001 | Gladden et al. | |
| 6,701,717 | B2 * | 3/2004 | Flatman et al. | 60/792 |
| 6,973,771 | B2 * | 12/2005 | Nottin | 60/39.5 |

FOREIGN PATENT DOCUMENTS

| | | |
|---|---|---|
| FR | 2115342 | 7/1972 |
| GB | 2251657 | 7/1992 |
| GB | 2377973 | 1/2003 |

* cited by examiner

METHODS AND APPARATUS FOR ASSEMBLING GAS TURBINE ENGINES

BACKGROUND OF THE INVENTION

This invention relates generally to gas turbine engines, and more specifically to methods and apparatus for assembling gas turbine engines.

At least some known gas turbine engines used with aircraft include a core engine having, in serial flow arrangement, a compressor which compresses airflow entering the engine, a combustor which burns a mixture of fuel and air, and low and high pressure rotary assemblies which each include a plurality of rotor blades that extract rotational energy from airflow exiting the combustor to generate thrust from the engine. In addition, within at least some known gas turbines some of the work generated by the rotary assemblies is transmitted to an engine accessory gearbox by means of shaft wherein the available work can then be used to drive electrical equipment utilized on the aircraft.

As aircraft accessory power demands have increased, there also has been an increased need to run the gas turbine engines at idle speeds that may be higher than other engines not subjected to increased power demands. More specifically, increasing the idle speeds enables the increased power demands to be met without sacrificing compressor stall margins. However, the increased idle speeds may also generate thrust levels for the engine which are higher than desired for both flight idle decent operations and/or during ground idle operations. Over time, continued operation with increased thrust levels during such idle operations may increase maintenance costs and the increased fuel flows may also increase aircraft operating expenses.

BRIEF SUMMARY OF THE INVENTION

In one aspect, a method for assembling a gas turbine engine including a compressor and a rotor assembly coupled in axial flow communication downstream from the compressor is provided. The method comprises coupling a bypass system in flow communication with the compressor to channel a portion of flow discharged from the compressor towards the rotor assembly is channeled through the bypass system, and coupling a downstream end of the bypass system within the gas turbine engine such that the flow entering the bypass system flows past the rotor assembly and is discharged downstream from the rotor assembly.

In another aspect, a rotor assembly for a gas turbine engine including a compressor is provided. The rotor assembly includes a rotor coupled in axial flow communication downstream from the combustor, and a bypass system coupled in flow communication to the compressor for channeling a portion of flow discharged from said compressor around said rotor.

In a further aspect, a gas turbine engine is provided. The gas turbine engine includes a compressor, a rotor, and a bypass system. The rotor is coupled downstream from and in axial flow-communication with the compressor. The bypass system is coupled in flow communication to the compressor for channeling a portion of flow discharged from the compressor around the rotor during engine operation.

DETAILED DESCRIPTION OF THE INVENTION

Figure 1:
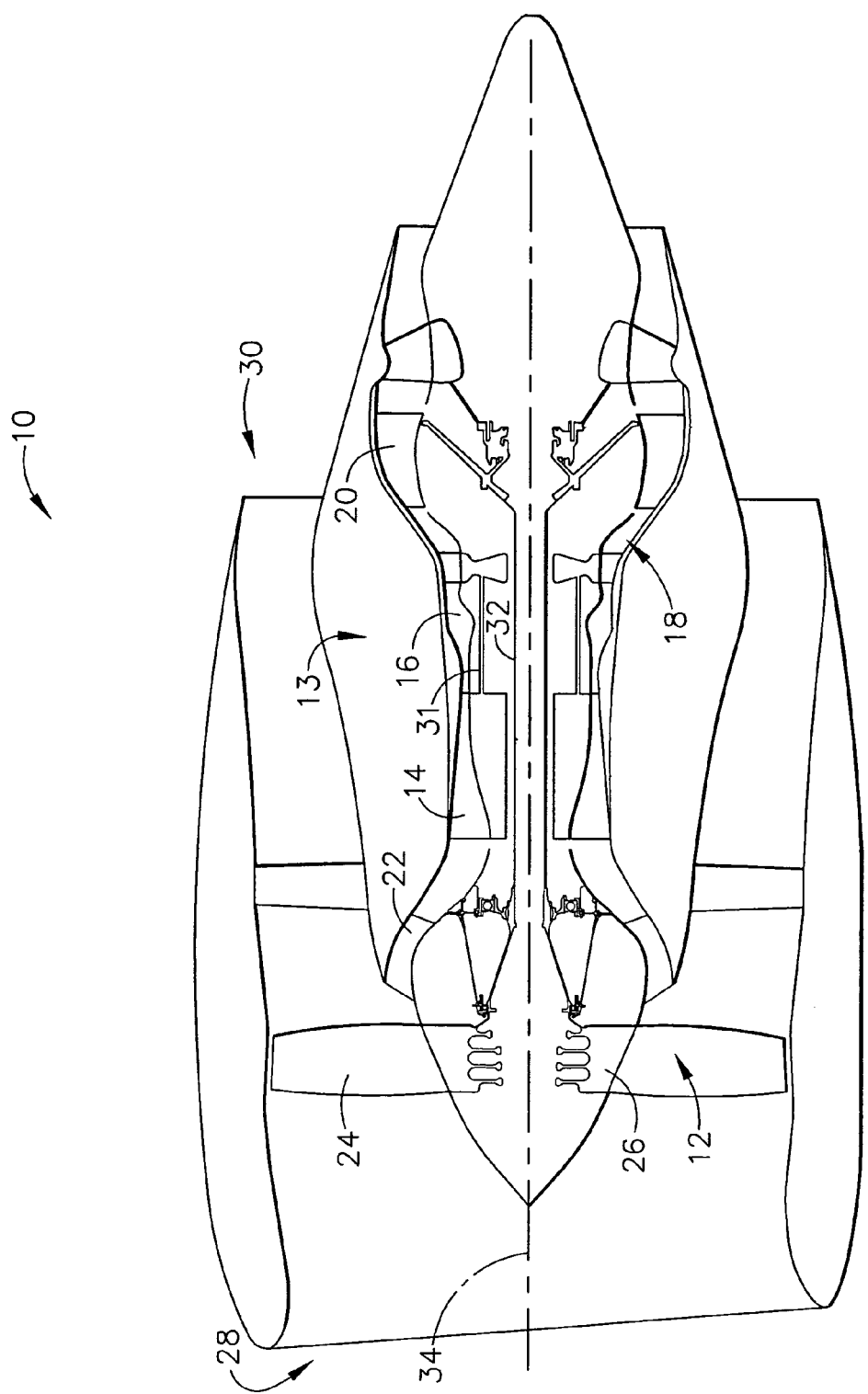
FIG. 1 is schematic illustration of an exemplary gas turbine engine.

FIG. 1 is a schematic illustration of a gas turbine engine 10 including a fan assembly 12, a booster 22, a high pressure compressor 14, and a combustor 16. Engine 10 also includes a high pressure turbine 18, and a low pressure turbine 20. Fan assembly 12 includes an array of fan blades 24 extending radially outward from a rotor disc 26. Engine 10 has an intake side 28 and an exhaust side 30. Fan assembly 12 and turbine 20 are coupled by a first rotor shaft 31, and compressor 14 and turbine 18 are coupled by a second rotor shaft 32. In the exemplary embodiment, high pressure turbine 18 is also coupled to a shaft (not shown) which provides a rotary motive force to drive a driven machine, such as, but, not limited to a gearbox, a transmission, a generator, a fan, or a pump.

In operation, air flows through fan assembly 12 and compressed air is supplied to high pressure compressor 14. The highly compressed air is delivered to combustor 16. Airflow (not shown in FIG. 1) from combustor 16 drives turbines 18 and 20, and turbine 20 drives fan assembly 12 by way of shaft 31. Moreover, the accessory gearbox is also driven by turbine 18.

Figure 2:
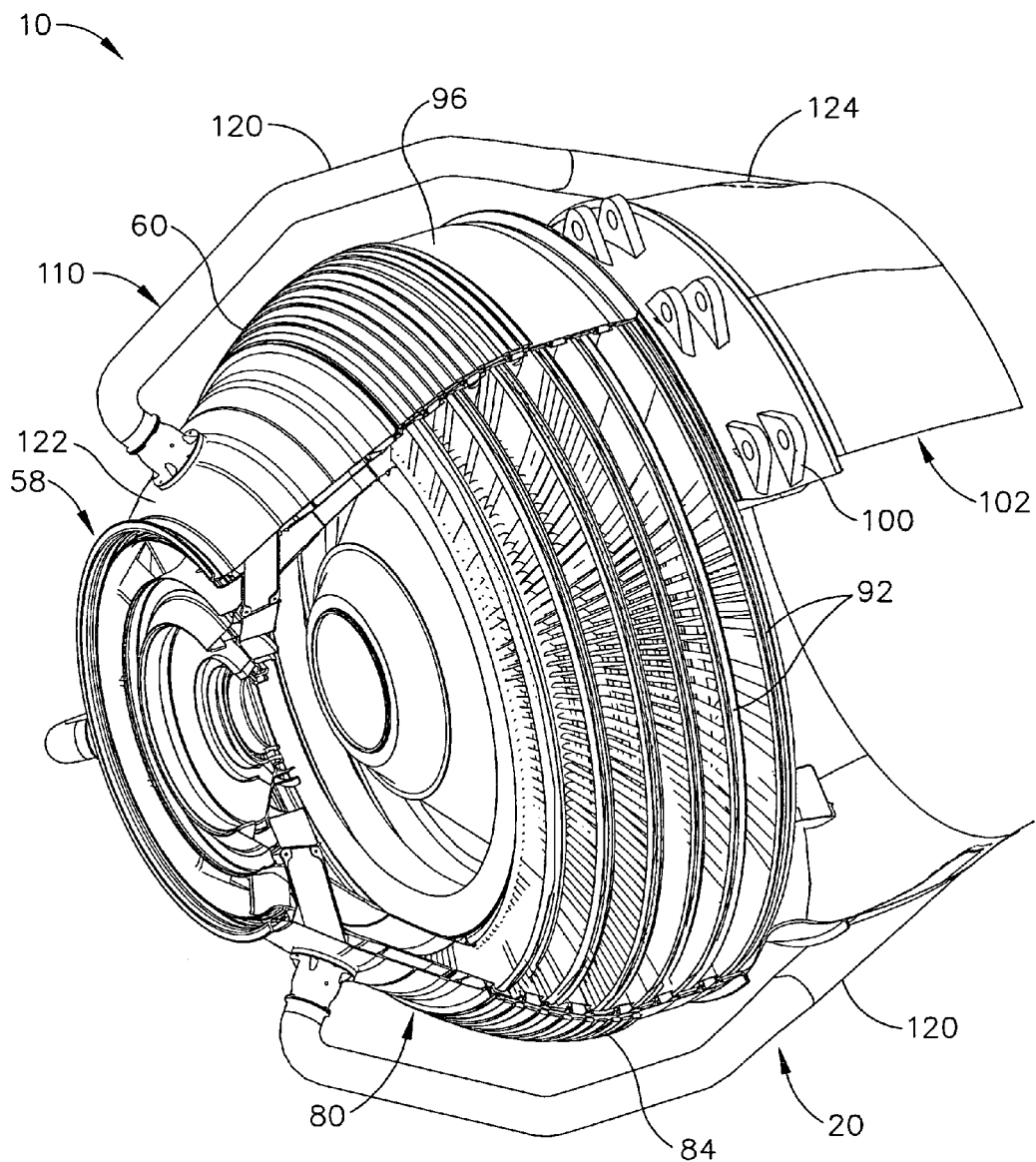
FIG. 2 is an enlarged cross-sectional schematic view of a portion of the gas turbine engine shown in FIG. 1.
Figure 3:
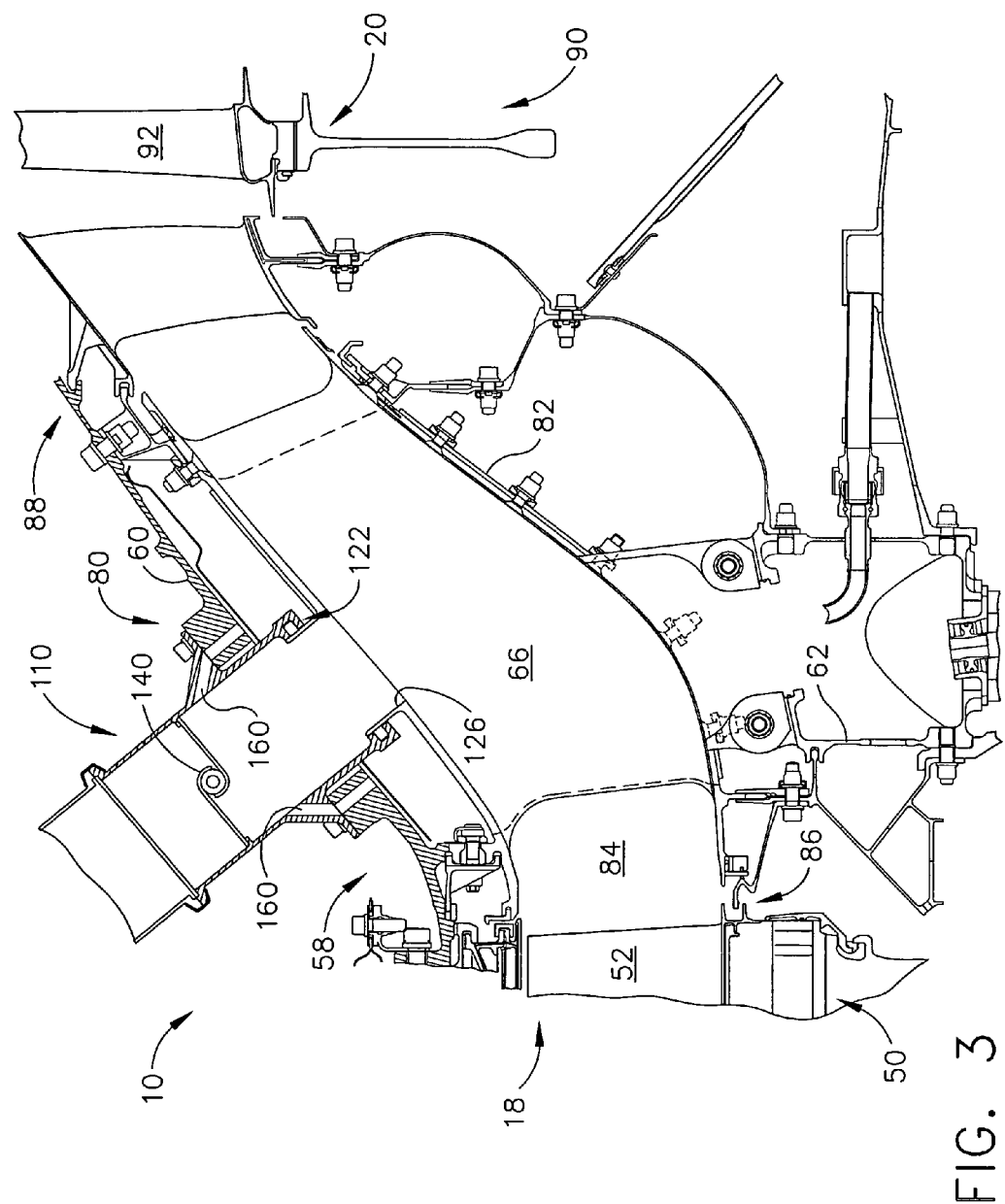
FIG. 3 is a perspective view of a portion of the gas turbine engine shown in FIG. 2.

FIG. 2 is an enlarged cross-sectional schematic view of a portion of gas turbine engine 10. FIG. 3 is a perspective view of the portion of gas turbine engine 10 shown in FIG. 2. High pressure turbine 18 includes a plurality of stages 50, and each stage includes a row of rotor blades 52 and a row of stationary vanes (not shown).

A load-bearing annular turbine frame 58 extends downstream from turbine 18. Frame 58 includes a radially outer structural member or casing 60 that extends circumferentially around turbine 18, and a radially inner member or hub 62 that is coaxially aligned with respect to casing 60 about an axis of rotation of turbine engine 10. Hub 62 is radially inward from casing 60 and a plurality of circumferentially spaced apart hollow struts 66 extend radially between casing 60 and hub 62.

A transition duct 80 extends downstream from turbine frame 58. Specifically, transition duct 80 includes a plurality of panels 82 coupled together circumferentially such that a flow passageway 84 is defined through transition duct 80 between high pressure turbine 18 and low pressure turbine 20. Accordingly, panels 82 extend generally axially between an upstream end 86 of transition duct 80 and a downstream end 88 of duct 80.

Low pressure turbine 18 includes a plurality of stages 90, and each stage includes a row of circumferentially-spaced rotor blades 92 and a row of circumferentially-spaced stationary vanes 94. In the exemplary embodiment, turbine 20 is coupled in axial flow communication to turbine 18 and is substantially concentrically aligned with respect to turbine 18. A casing 96 extends circumferentially around turbine 20. More specifically, casing 96 extends downstream from extension duct 80 to a turbine rear frame 100. Turbine rear frame 100 is annular and extends between casing 96 and a primary exhaust nozzle 102.

A bypass system 110 is coupled in flow communication to compressor 14, and downstream from compressor 14, such that a portion of flow discharged from compressor 14 is channeled through bypass system 110, as is described in more detail below. In the exemplary embodiment, bypass system 110 is coupled between high and low pressure turbines 18 and 20, respectively, and more specifically, between a pair of circumferentially adjacent struts 66 within transition duct 80. In an alternative embodiment, bypass system 110 is coupled downstream from struts 66. In another alternative embodiment, bypass system 110 is coupled upstream from struts 66. Alternatively, bypass system 110 may be coupled at any location downstream from compressor 14 that enables bypass system 110 to function generally as described herein.

In the exemplary embodiment, bypass system 110 includes a plurality of circumferentially-spaced bypass ducts 120 that each extend from an inlet 122 to a discharge outlet 124. In an alternative embodiment, bypass system 110 includes only one bypass duct 120. In another alternative embodiment, bypass system 110 includes at least one arcuate plenum that extends between ducts 120 and transition duct 80 such that a portion of flow discharged from compressor 14 is channeled through the plenum prior to being routed through ducts 120. Accordingly, in such an embodiment, the plenum couples at least two adjacent ducts 120 together in flow communication.

In the exemplary embodiment, each bypass duct inlet 122 extends through an opening 126 formed in transition duct 80 along a radially outer boundary of flow passageway 84. Each discharge outlet 124 is coupled to engine 10 downstream from turbine 20, and more specifically, to primary exhaust nozzle 102, such that flow discharged from bypass ducts 120 is directed into the gas flowpath of turbine 20. In an alternative embodiment, flow discharged from bypass ducts 120 is channeled through at least one cavity (not shown) defined within engine 10 aft of turbine rear frame 100. In another alternative embodiment, flow discharged from bypass ducts 120 is channeled into a primary bypass stream duct (not shown) extending downstream from fan assembly 12 (shown in FIG. 1). In a further alternative embodiment, flow is discharged to ambient from bypass ducts 120. Alternatively, flow may be discharged from bypass system 110 at any location downstream from the specific turbine being bypassed, i.e., turbine 20, that enables bypass system 110 to function generally as described herein.

In the exemplary embodiment, each bypass duct 120 includes a flow control device 140 housed therein. More specifically, in the exemplary embodiment, each flow control device 140 is a butterfly valve that is rotatably coupled within each duct 120. In an alternative embodiment, each flow control device 140 is a flapper valve that is actuator-controlled. In a further alternative embodiment, each flow control device 140 is a poppet valve that is biased in a closed position. Alternatively, flow control device 140 is any type of flow control mechanism that enables flow control device 140 to function as described herein.

In each embodiment, flow control device 140 is resistant to high operating temperatures and is selectably positionable between an open position and a closed position to control an amount of flow entering bypass system 110. Specifically, in the closed position, flow control device 140 substantially seals bypass duct inlet 122 such that bypass flow is prevented from entering system duct 120. In contrast, when flow control device 140 is opened, a portion of flow discharged from compressor 14, or in the exemplary embodiment, turbine 18, is channeled into bypass system 110 and routed around turbine 20. In one embodiment, when each control device 140 is opened, approximately 10% of flow discharged from turbine 18 is channeled around turbine 20 through bypass system 110 during pre-selected engine operational periods.

In the exemplary embodiment, flow control device 140 is electrically coupled to an engine control system which automatically controls the position of flow control device 140. In one embodiment, the engine control system is a full authority digital electronic control system (FADEC) commercially available from Lockheed Martin Control Systems, Johnson City, N.Y. The engine control system alters the position of flow control devices 140 to control operation of bypass system 110.

To facilitate cooling flow control device 140, bypass system 110 is also coupled in flow communication to a cooling source. Specifically in the exemplary embodiment, each duct 120 includes a plurality of cooling openings 160 which enable cooling fluid to be channeled into each duct 120 to facilitate reducing an operating temperature of each flow control device 140. More specifically, in the exemplary embodiment, openings 160 enable a continuous purge flow of cooling fluid to be channeled into ducts 120. For example, in one embodiment, compressor discharge air is channeled through openings 160. In another embodiment, interstage compressor air is channeled through openings 160.

During idle engine operating speeds, and more specifically, during flight idle decent operating conditions and ground idle operating conditions, increased power demands may require engine 10 to operate at an idle speed that is higher than idle speeds of other known gas turbine engines. The increased idle speed enables engine 10 to satisfy the increased power demands while maintaining compressor stall margins. During such engine operating conditions, flow control devices 140 are opened such that a portion of flow discharged from compressor 14 is channeled through bypass system 110. In the exemplary embodiment, because the flow enters bypass system 110 aft of turbine 18, flow through high pressure turbine 18 is not disrupted.

Accordingly, during operation of bypass system 110, turbine 18 can continue to operate at an increased operational speed necessary to meet the power demands, without an increased amount of thrust being generated. More specifically, because less flow is channeled through turbine 20 during operation of bypass system 110, bypass system 110 facilitates reducing an amount of thrust generated from engine 10 in comparison to operating periods when turbine 18 is operated at the same operational speed while bypass system 110 is non-operational. Accordingly, during ground idle operations, because less thrust is generated from engine 10 during operation of bypass system 110, maintenance of aircraft braking systems, for example, is facilitated to be reduced, as less braking is necessary during such engine operational periods. Moreover, during aircraft flight operations, operation of bypass system 110 facilitates reduced flight idle thrusts during decent operations. As such, bypass system 110 facilitates improving short range fuel burn while maintaining adequate compressor stall margin during high power extraction operating conditions.

The above-described frame is cost-effective and highly reliable. The frame includes a bypass system coupled to a transition duct extending between the high and low pressure turbines. The bypass system enables a portion of flow discharged from the high pressure turbine to be channeled around the low pressure turbine during pre-selected engine operational periods. Because a portion of the flow is bypassed around the low pressure turbine, less thrust is generated from the engine during the pre-selected engine operational periods. As a result, the bypass system overcomes known manufacturing gas turbine operating limitations during high power extraction operations in a cost-effective and reliable manner, while maintaining compressor stall margin.

Exemplary embodiments of turbine frames are described above in detail. The frames are not limited to the specific embodiments described herein, but rather, components of each assembly may be utilized independently and separately from other components described herein. For example, each bypass system component can also be used in combination with other turbine frame components. Furthermore, each bypass system component may also be used with other gas turbine engine configurations.

While the invention has been described in terms of various specific embodiments, those skilled in the art will recognize that the invention can be practiced with modification within the spirit and scope of the claims.

What is claimed is:

1. A method for assembling a gas turbine engine, said method comprising:
   providing a fan assembly;
   coupling a compressor downstream from the fan assembly and in flow communication with the fan assembly;
   coupling a high-pressure turbine to the compressor;
   coupling a low-pressure turbine to the fan assembly such that the low-pressure turbine is downstream from the high-pressure turbine; and
   coupling a bypass system to the gas turbine engine, wherein the bypass system has a plurality of circumferentially-spaced bypass ducts each having an upstream end coupled upstream from the low-pressure turbine to a transition duct downstream of the high pressure turbine having an upstream end and downstream end, the transition duct diverging from an engine centerline axis such that at the downstream end, the duct is positioned substantially radially further from the axis than at the upstream end, each said bypass duct having a downstream end coupled to the gas turbine engine downstream from the low-pressure turbine such that a portion of the airflow discharged from the high-pressure turbine is channeled through the upstream end of each respective bypass duct, bypassed around the low-pressure turbine, and is discharged through the downstream end of each respective bypass duct and is directed into the gas flowpath downstream from the low-pressure turbine to facilitate controlling gas turbine engine thrust.

2. A method in accordance with claim 1 further comprising coupling the bypass system in flow communication with the high-pressure turbine such that a portion of flow discharged from the high-pressure turbine is channeled through the bypass system only during pre-selected engine operations.

3. A method in accordance with claim 1 further comprising coupling a flow control assembly within the bypass system that is selectively operable to control flow through the bypass system during engine operation.

4. A method in accordance with claim 1 further comprising coupling the bypass system in flow communication with the high-pressure turbine to facilitate reducing engine thrust generated during pre-selected engine operation periods.

5. A thrust control assembly for a gas turbine engine including a fan assembly, a compressor downstream from the fan assembly, a high-pressure turbine coupled to the compressor, and a low-pressure turbine coupled to the fan assembly, said thrust control assembly comprising:
   a bypass system including a plurality of circumferentially-spaced bypass ducts, each said bypass duct having an upstream end coupled to said gas turbine engine upstream from said low-pressure turbine to a transition duct downstream of the high pressure turbine having an upstream end and downstream end, the transition duct diverging from an engine centerline axis such that at the downstream end, the duct is positioned substantially radially further from the axis than at the upstream end, each said bypass duct having a downstream end coupled to said gas turbine engine downstream from said low-pressure turbine such that a portion of the airflow discharged from said high-pressure turbine is channeled through the upstream end of each said bypass duct, bypassed around said low-pressure turbine, and is discharged through the downstream end of each said bypass duct and directed into the gas flowpath downstream from the low-pressure turbine to facilitate controlling gas turbine engine thrust.

6. A thrust control assembly in accordance with claim 5 wherein said bypass system comprises a flow control device for selectively controlling an amount of fluid flow channeled through said bypass system.

7. A thrust control assembly in accordance with claim 5 wherein said bypass system channels a portion of flow from said compressor around said rotor only during pre-selected engine operational periods.

8. A thrust control assembly in accordance with claim 5 wherein said bypass system further comprises a plenum coupled to an outlet of said high-pressure turbine, said plurality of ducts coupled to said plenum.

9. A gas turbine engine comprising:
   a fan assembly;
   a compressor downstream from said fan assembly;
   a high pressure turbine coupled to said compressor;
   a low-pressure turbine coupled to said fan assembly; and
   a bypass system including a plurality of circumferentially-spaced bypass ducts, each said bypass duct having an upstream end coupled to said gas turbine engine upstream from said low-pressure turbine to a transition duct downstream of the high pressure turbine having an upstream end and downstream end, the transition duct diverging from an engine centerline axis such that at the downstream end, the duct is positioned substantially radially further from the axis than at the upstream end, each said bypass duct having a downstream end coupled to said gas turbine engine downstream from said low-pressure turbine such that a portion of the airflow discharged from said high-pressure turbine is channeled through the upstream end of each said bypass duct, bypassed around said low-pressure turbine, and is discharged through the downstream end of each said bypass duct and directed into the gas flowpath downstream from the low-pressure turbine to facilitate controlling gas turbine engine thrust.

10. A gas turbine engine in accordance with claim 9 wherein said bypass system channels flow around said low-pressure turbine only during pre-selected engine operations.

11. A gas turbine engine in accordance with claim 9 wherein said plurality of ducts are coupled together in flow communication to said high-pressure turbine by a plenum.

12. A gas turbine engine in accordance with claim 9 wherein said bypass system facilitates reducing overall engine thrust.

13. A gas turbine engine in accordance with claim 9 wherein said bypass system facilitates maintaining compressor stall margin.

14. A gas turbine engine in accordance with claim 9 wherein said bypass system comprises a flow control device for selectively controlling an amount of fluid flow channeled through said bypass system.

* * * * *